H. CREHAN.
BOLT FINISHING MACHINE.
APPLICATION FILED MAR. 8, 1920.

1,420,410.

Patented June 20, 1922.
6 SHEETS—SHEET 1.

FIG.1.

INVENTOR
Hubert Crehan
by William B. Wharton
his attorney

H. CREHAN.
BOLT FINISHING MACHINE.
APPLICATION FILED MAR. 8, 1920.

1,420,410.

Patented June 20, 1922.
6 SHEETS—SHEET 3.

INVENTOR
Hubert Crehan
by
William B. Wharton
his attorney

H. CREHAN.
BOLT FINISHING MACHINE.
APPLICATION FILED MAR. 8, 1920.

1,420,410.

Patented June 20, 1922.
6 SHEETS—SHEET 5.

INVENTOR
Hubert Crehan
by William B. Wharton
his attorney

H. CREHAN.
BOLT FINISHING MACHINE.
APPLICATION FILED MAR. 8, 1920.

1,420,410.

Patented June 20, 1922.
6 SHEETS—SHEET 6.

INVENTOR
Hubert Crehan
by William B. Wharton
his attorney

UNITED STATES PATENT OFFICE.

HUBERT CREHAN, OF PITTSBURGH, PENNSYLVANIA.

BOLT-FINISHING MACHINE.

1,420,410.           Specification of Letters Patent.      Patented June 20, 1922.

Application filed March 8, 1920. Serial No. 363,945.

*To all whom it may concern:*

Be it known that I, HUBERT CREHAN, a citizen of the United States, and resident of Pittsburgh, in the county of Allegheny and State of Pennsylvania, have invented a new and useful Improvement in a Bolt-Finishing Machine, of which the following is a specification.

This invention relates to a bolt finishing machine.

One object of the invention is to provide a machine in which pointing, screw threading, and nut attaching operations are successively and automatically performed upon a previously formed blank bolt.

Further objects of the invention, as will hereinafter appear, lie in the means for presenting the bolt to suitable heads for performing the pointing, screw threading, and nut attaching operations, and in so constructing and arranging such heads, and the operating means therefor that the quality of the work is brought to a high state of perfection and the possibility of stoppages in the machine or failure to perform all operations is minimized.

In the accompanying drawings

The machine, as a whole, is mounted upon a suitable standard or table 1, and receives power from any convenient source, as by means of the pulley 2, which is mounted on a shaft 3 in a bearing 4 and arranged for the attachment of a driving belt. On the shaft 3 is a pinion 5 which meshes with a gear 6 mounted on a shaft in the bearing standard 7, and in turn meshing with a gear 8 of equal size, which is freely mounted on a shaft 9 for actuating the bolt carrying means. The shaft 9 is journalled in the standards 10 and 11, and at its forward extremity carries a gear 12 meshing with a similar gear 13.

The bolt carrying turret 14 is mounted on a shaft 15 which is rotatable in bearing members 16, and 17 on the table 1; and carries a plurality of bolt holding chucks 18 for presenting a bolt in operative relation to the pointing head 19, screw threading head 20, and nut attaching head 21. In order to present a bolt for these successive operations, it is necessary that the turret be rotated by a step by step movement and locked in position between steps with bolts in proper position before one or more of the operating heads or chucks 19, 20, and 21.

Figure 1:
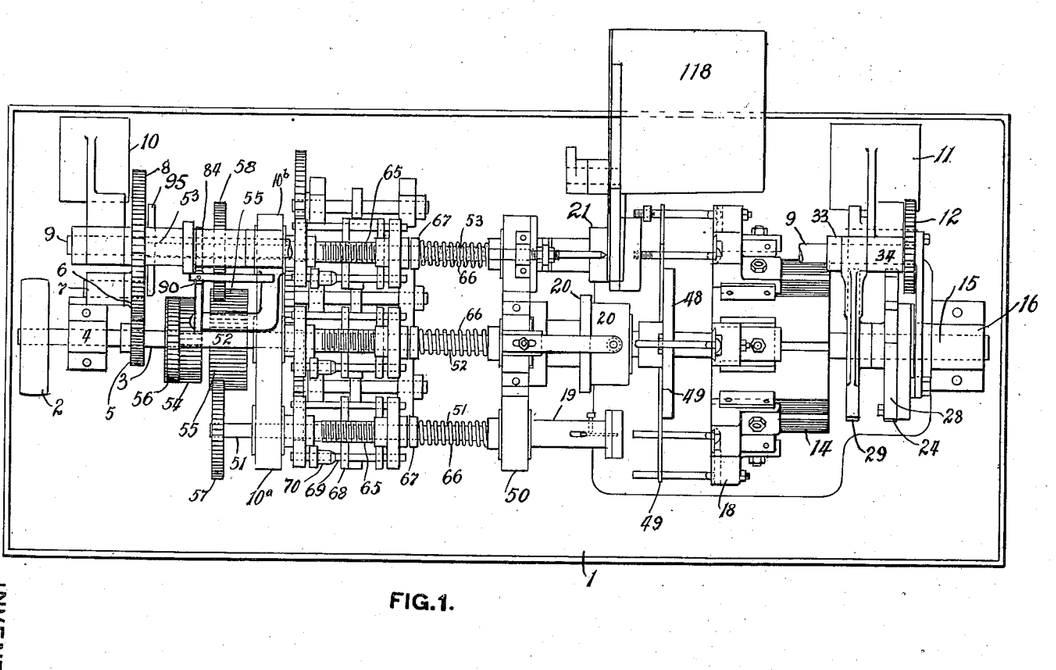
Fig. 1 is a plan view of the machine.
Figure 2:
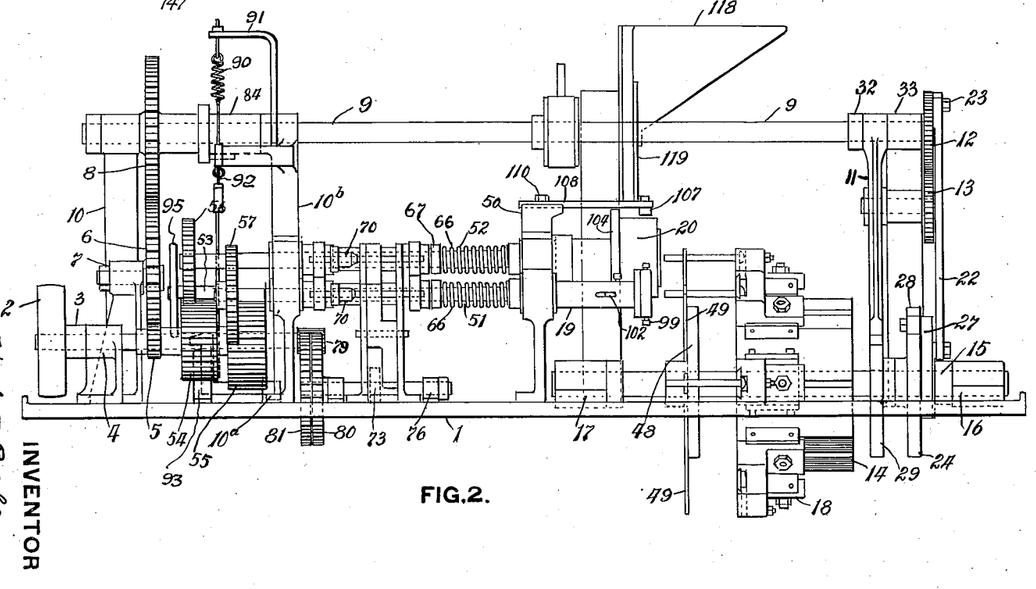
Fig. 2 is a side elevation thereof.
Figures 3, 4:
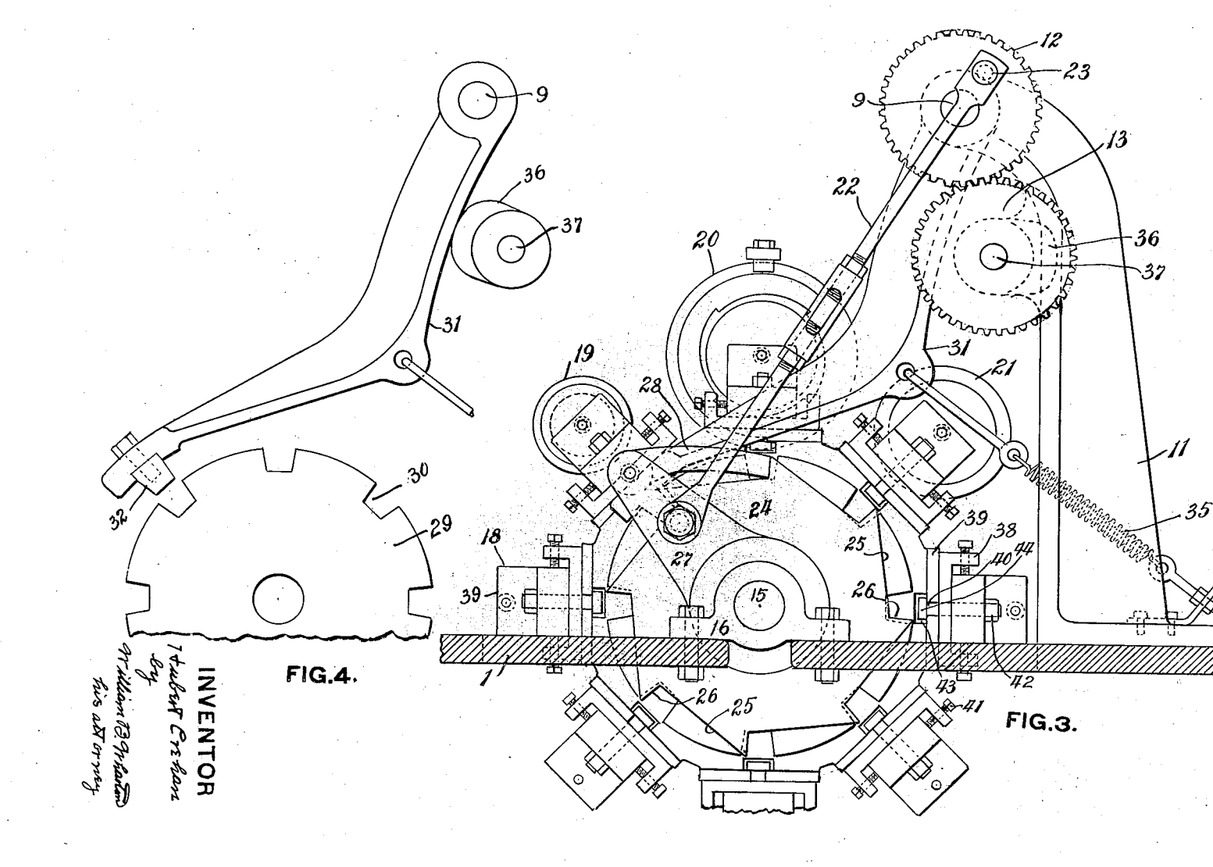
Fig. 3 is an end elevation illustrating the means for presenting bolt to the operating heads.
Fig. 4 is a detail view illustrating in elevation a portion of such mechanism.
Figure 5:
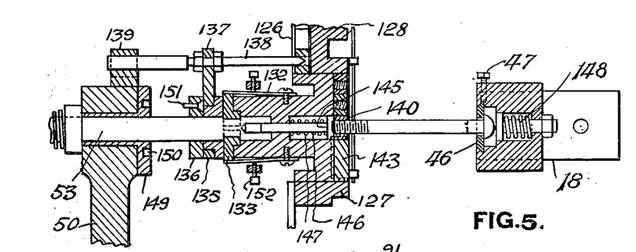
Fig. 5 is a sectional detail of one of the bolt carrying chucks and of the nutting head of the machine, showing the nutting head in advanced or operative position.

The turret 14 is rotated and locked by means of connections with the shaft 9. Such actuating connections (with particular reference to Figure 3 of the drawings) comprise an operating arm 22 eccentrically connected at 23 with the face of the gear wheel 12, and arranged to actuate a driving wheel 24 rigidly secured to the turret shaft 15. The driving wheel 24 is provided with a plurality of peripherally arranged cuts or ledges 25 furnishing engaging shoulders 26. The eccentric operating rod 22 is connected with an arm 27 which is rotatably mounted on a hub on the driving wheel 24. Loosely held on the arm 27 is an actuating dog 28 arranged to engage shoulders 26 on the driving wheel. In rotating turret 14, rotation of shaft 9 and gear 12 causes the operating rod 22 and arm 27 to first disengage dog 28 from the shoulder 26 of the driving wheel against which it lies and to drag it backwardly until it enters the next succeeding cut or ledge 25 of the driving wheel. The further action of the eccentric rod 22, during the same rotation of shaft 9, causes the dog to engage the shoulder 26 of this succeeding ledge and to rotate the turret one step. This actuation is secured during the remaining portion of the same single rotation of the shaft 9 to the point at which eccentric rod 22 again reaches its dead center. The means for causing a single timed rotation of shaft 9 will be hereinafter described.

The means for positively locking the turret 14 after a single forward step comprise a locking wheel 29, rigidly secured to the turret shaft 15 and having in its periphery a plurality of locking recesses 30; and a lever arm 31 carrying a suitable locking piece 32 arranged to engage in the recesses 30. Lever arm 31 is supported on shaft 9 between a collar 33 and the bearing 34 in standard 11, and has connected therewith the spring 35 arranged to exert a force tending to maintain the locking piece 32 in one of the locking recesses 30. For lifting the lever arm 31, the cam 36 mounted on a shaft 37 driven by gear 13 is provided. The gear 13 is actuated by gear 12 at an equal rate of speed therewith and during each rotation of the gear 12 with that of the shaft 9, the cam 36 serves to raise the lever arm 31 and cause the locking piece 32 to be withdrawn from the recess 30 in which it lies. After the cam has passed the lever arm, the spring 35 forces the lever arm into such position that the locking piece 32 engages the next succeeding notch to hold the turret securely in proper position before the operating heads or chucks. Cam 36 is so positioned and designed with relation to the mechanism for positively rotating the turret, that the disengagement of the locking piece leads by an instant the rotating impulse imparted to the turret.

As shown in Figures 1, 2, 3, and 5 of the drawings, the bolt holding chucks 18 each comprises a frame or body member 38, and a bolt holding member 39, having in its face a slot 40 arranged to receive the head of a bolt. Set screws 41 permit of adjustment of the bolt holding member 39 laterally with relation to the frame member 38. The body member 38 is secured in position on the turret by means of a locking bolt 42 which extends into a groove 43 in the body of the turret and has a head 44 bearing against the under side of plates 39 secured to the body of the turret. Forwardly of slot 40 in the face of bolt holding member 18 is a vertically adjustable plate 46 secured in position by a set screw 47, for accurately regulating the position in which such bolt is held relatively to the operating heads.

Rigidly secured to the turret shaft 15, between the turret and the operating heads, is the carrying wheel 48, having a plurality of arms 49 which are forked at their extremities to receive and support the forward portion of bolts, the heads of which lie in the seats in the bolt holding chucks 18.

Mounted in the main standards 10ᵃ and 50, are the operating spindles 51 for the pointing head 19, 52 for the screw threading head 20, and 53 for the nut attaching head 21. These spindles are so arranged as to rotate continuously, and also to be automatically advanced and retracted relatively to the bolt carrying turret.

The means for rotating the spindles 51, 52 and 53, comprise the wide gears 54 and 55 on the main shaft 3 of the machine. With the gear 54 meshes the gear 56 on spindle 52, and with the gear 55 mesh gears 57 and 58 on the spindles 51 and 53 respectively.

The mechanism for advancing and retracting the spindles corresponds in general to that described and claimed in my prior Patent No. 1,327,312, dated January 6, 1920; but with the exception that the present construction provides automatically operating means for causing advancement of the spindles.

Figure 23:
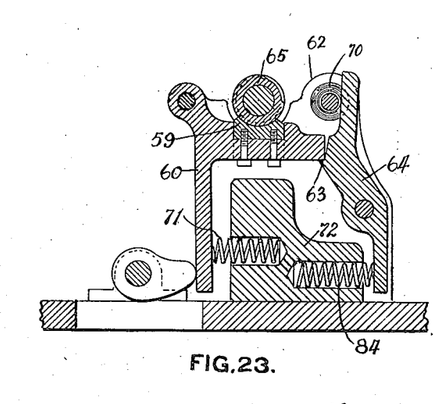
Fig. 23 is a sectional detail view of such latch mechanism showing it in locked position for advancing a spindle.
Figure 24:
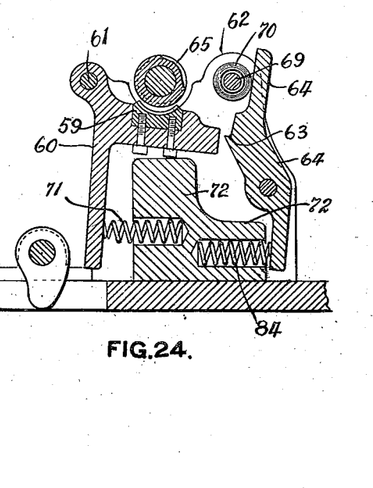
Fig. 24 is a similar view showing it in open or inoperative position.

With particular reference to Figures 23 and 24 of the drawings, such mechanism comprises a segmental nut 59 carried by a bell crank lever 60 pivotally mounted on a shaft 61 in supports 62. Engaging by means of a shoulder 63 with the lever 60 is a latch lever 64, which when in engaging position, as shown in Figure 23 serves to lock the segmental nut 59 in engagement with a screw threaded portion 65 on the spindle. As the spindle is being constantly rotated, this engagement causes it to travel forward, carrying with it, its operating head.

Each of the spindles 51, 52 and 53 is provided with a stiff helical spring 66, bearing at one extremity against the standard 50 and at the other, against a collar 67 on the spindle. These springs 66 are compressed during forward movement of the spindles. During this forward movement the gears 56, 57 and 58 of the spindles ride forward on the wide gears 54 and 55.

Arranged to be carried forward by the spindle in connection with which it is mounted, is a guide frame 68 on one of the rods 69 of which is carried a cone 70. When forward movement of the spindle has progressed to a predetermined point, the cone 70 contacting with the latch lever 64, forces its shoulder 63 out of engagement with the nut supporting lever 60, permitting the lever 60 to drop carrying with it the segmental nut 58. This action is assisted by a spring 71, bearing against a central block 72 and against the lower portion of the nut supporting lever 60. This mechanism is identical for each of the spindles.

Upon disengagement of the segmental nuts from the screw threaded portion 65 of each of the spindles, the springs 66 which have been compressed during the forward movement, force the spindles rearwardly until the guide frames 68 come in contact with the standard 10ª and the operating heads on the spindles come in contact with standard 50. During this backward movement, also the spindle gears 56, 57, and 58 ride upon the gears 54 and 55.

Figure 21:
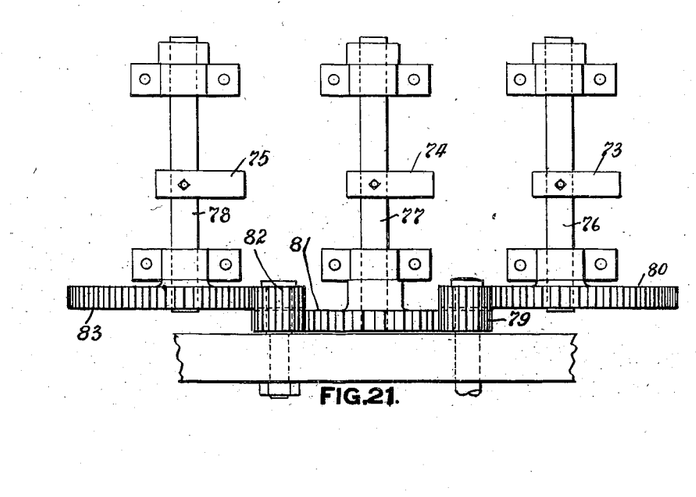
Fig. 21 is a plan view of the connections for causing an automatic locking of the latch mechanism for advancing and retracting the spindles of the operating heads.
Figure 22:
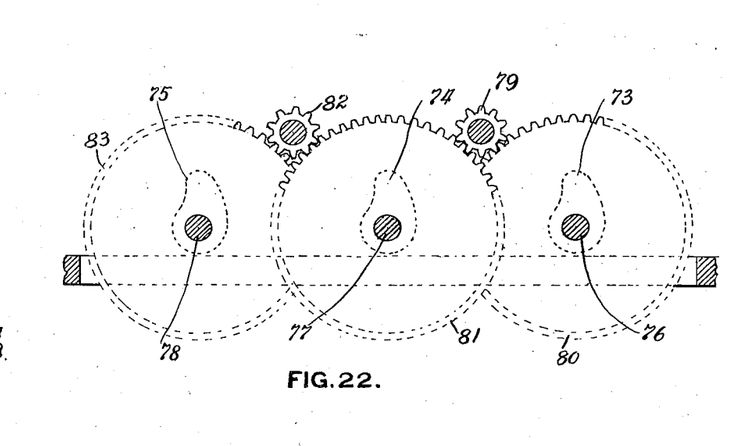
Fig. 22 is a rear elevation of such connections.

The automatic means for restoring the segmental nut to its operative position comprise cams 73, 74 and 75, mounted respectively on shafts 76, 77 and 78, and arranged to contact the lower portion of the nut supporting lever 60 of each of the head operating spindles 51, 52 and 53. The mechanism for actuating the cam shafts comprises the following connections, particular reference being had to Figure 21 of the drawings:

On the main shaft 3 of the machine, forwardly of the standard 10, is the pinion 79 with which mesh gears 80 and 81 on cam shafts 76 and 77 respectively. Meshing with gear 81 is an idler pinion 82 which also meshes with gear 83 on the cam shaft 78. The cam shafts are all thus rotated at an equal rate of speed; and being connected with the main driving shaft of the machine, are readily arranged so that their period of rotation bears a definite relation to the period of rotation of the spindles.

When the latch lever 64 and nut supporting lever 60 are in their operative position, the cams merely come in contact with the lower portion of lever 60 without performing any function thereon. When, however, the levers are in their disengaged and inoperative position, the next succeeding rotation of each of the cam shafts causes the cams to strike the lower portion of the nut supporting lever 60, which has been forced outwardly by the spring 71. This action, assisted by a spring 84 bearing against central block 72 and the lower portion of lever 64, causes the upper portions of the levers 60 and 64 to be forced upwardly into such position that the shoulder 63 of the latch lever again engages the nut supporting lever. The segmental nut 59 of each engaging mechanism is thus again brought into contact with the screw threaded portion 65 of each of the spindles 51, 52, and 53 for advancing the spindles.

In order that the rotation of shaft 9, operating the bolt carrying turret 14, by means of the mechanism previously described, may be synchronized with the advancement and retraction of the operating spindles; the tripping mechanism illustrated in detail in Figures 17, 18, 19, and 20 is provided.

The gear 8, to which power is imparted from the main shaft 3 by means of pinion 5 and gear 6, loosely surrounds the shaft 9, so that its rotation does not normally impart power to the shaft. Abutting against the gear 8 is a collar 84 splined to the shaft 9. In the collar 84 is a key 85 which a spring 86 tends to force into a locking recess 87 in the gear 7, for operatively connecting the gear with the collar 84 and shaft 9. The key 85 is held out of locking recess 87 by means of a latch hook 88 which is pivotally mounted on a shaft 89 on standard 10ᵇ, and which is arranged to enter a recess in the key 85. A helical spring 90, connected with an overhanging support 91, normally holds the latch hook 88 in engagement with the collar and in the recess of key 85.

The latch hook 88 is connected by means of an operating rod 92 with a tripping lever 93, mounted on a horizontal axis and having an upwardly extending portion terminating in a beveled head 94. Adjacent the rearward extremity of spindle 53 is a tripping disk 95, longitudinally adjustable on the spindle 53.

As the spindle 53 advances, the tripping disk 95 rides onto the beveled head 94 of the tripping lever 93. The lever 93, by means of its connection through rod 92, draws the latch hook 88 out of engagement with collar 84 and the recess in key 85. This permits the spring 86 to force the key into the locking recess 87 in gear 8, thus connecting collar 84 and shaft 9 with the gear 8 and causing rotation of the shaft.

The tripping disk 95 is so adjusted on spindle 53, relatively to the position of the head 94 of the tripping lever, that the latch hook 88 is withdrawn just as spindle 53, together with the other spindles, completes its forward movement. Upon retraction of the spindles, tripping disk 95 is immediately withdrawn from engagement with lever 93, permitting spring 90 to again bring latch hook 88 into engagement with the collar 84. The shaft 9 thus makes but a single revolution before the latch hook again enters the recess in key 85, to withdraw it from the locking recess in gear 7 and break the operative connection between this gear and the shaft 9. The latch hook 88 is beveled as shown in Figs. 17, 18 and 20, so that it is enabled to enter the recess in the key, when the latter is in its operative position, and withdraw it from locking recess 87 in the gear.

Figures 13, 14, 15, 16, 17, 18, 19, 20:
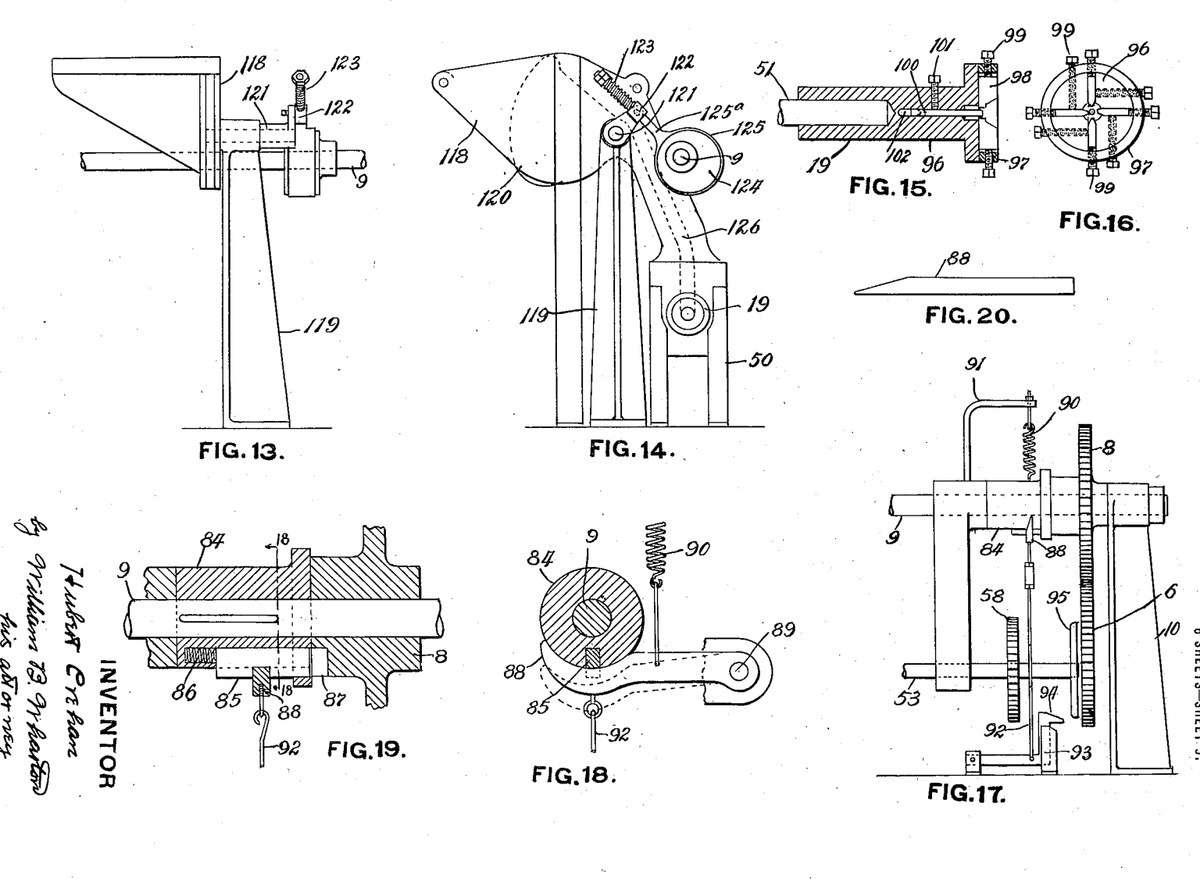
Fig. 13 is a rear elevation of the means for feeding nuts to the nut attaching head.
Fig. 14 is a side elevation thereof.
Fig. 15 is a section through the bolt pointing head.
Fig. 16 is a front elevation thereof.
Fig. 17 is a side elevation of tripping means for controlling movement of the shaft which actuates the bolt carrying means of the machine.
Fig. 18 is a cross sectional detail illustrating locking means comprised in the construction shown in Fig. 17.
Fig. 19 is a longitudinal sectional detail of the latch comprising a portion of the tripping mechanism.
Fig. 20 is a plan view of the latch hook cooperating with the locking means.

The pointing head 19, mounted on spindle 51, is illustrated in detail in Figs. 15 and 16 of the drawings. This head comprises a solid body portion 96, and a ring or hoop member 97 within which the pointing dies 98 are held by set screws 99. Within a longitudinal recess in the body member 96, is a rod 100, adjustable longitudinally of the head and secured in position by means of a set screw 101. Access to rod 100 is had through a slot 102 in the member 96. The function of the rod 100 is to act as a stop against which the bolt being pointed bears during pointing. The position of the rod relative to the pointing dies 98 thus regulates the extent of the pointing operation performed upon the bolt. In general, it is not desirable to remove much metal from a bolt by this operation, but merely to so bevel the end of the bolt that it is in true and proper form for the subsequent screw threading and nut attaching operations.

Figures 6, 7, 8, 9, 10, 11, 12:
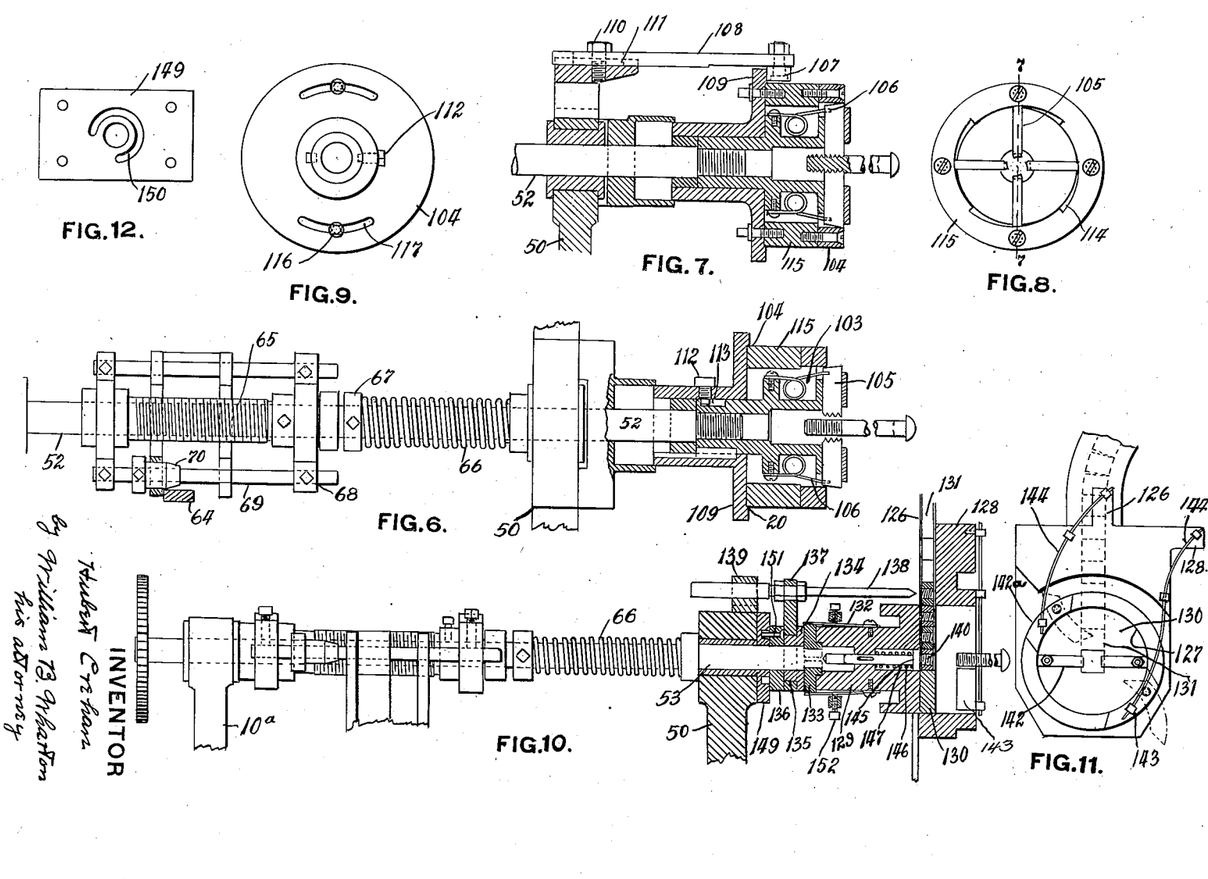
Fig. 6 is a view partly in section illustrating the screw threading head of the machine and the operating spindle therefor, and showing the screw threading dies in open or released position.
Fig. 7 is a more complete section through the screw threading head on the line 7—7 Fig. 8 and showing the dies closed.
Fig. 8 is a front elevation of the screw threading head.
Fig. 9 is a rear elevation of the screw threading head.
Fig. 10 is a vertical sectional view through the nut attaching head.
Fig. 11 is a front elevation of the nut attaching head.
Fig. 12 is an elevation of locking means for the nut attaching head.

The screw threading head 20, mounted on the spindle 52, is illustrated in detail in Figures 6, 7, 8, and 9, of the drawings. This head comprises an inner or chuck portion 103 secured to spindle 52, and a free outer or sleeve portion 104. In the chuck 103 are the screw threading dies 105, which are shown in Figure 7 of the drawings held in closed or cutting position by the sleeve 104. Springs 106, secured to the chuck 103, exert a force tending to open out the dies from this operative position.

Means are provided for withdrawing the sleeve 104, and permitting the cutters to open, an instant before the spindle 52 is retracted. This is necessary in order that the threading dies 105 may release the bolt being operated upon before withdrawal of the screw threading head. Such means comprise a knock off lug 107, mounted in an arm 108, secured to the standard 50 and arranged to contact a collar 109 on the sleeve 104 when the head 20 has been advanced a predetermined distance. This distance is regulated by means of a bolt 110 passing through a slot 111 in the arm 108 and engaging in the standard 50.

In the operation of the head, the knock off lug 107, contacting the collar 109 of sleeve 104 before the completion of the forward movement of the spindle, causes the sleeve to be drawn backwardly over cutting dies 105, as the spindle 52, carrying chuck 103, continues its forward movement. The threading dies 105 are formed, as shown, with rearwardly beveled upper edges, so that a partial withdrawal of sleeve 104 permits the springs 106 to force the dies outwardly to release the bolt which has been threaded. In order to prevent the sleeve from being drawn completely out of contact with the dies 105, the withdrawing action of the sleeve is limited by means of a set screw 112 passing through sleeve 104 and arranged to lie within a stop slot or recess 113 in the body of chuck 103. As the spindle approaches the limit of its backward motion under the impulsion of spring 66 after tripping of the latch mechanism, the sleeve 104 comes into violent contact with the standard 50 and is forced forwardly into position to again close the cutters for the next threading operation.

In order to regulate the depth of the thread cut on the bolt, cam seats 114 for contacting the cutting dies are provided in the forward portion 115 of the sleeve 104. This forward portion of the sleeve is secured to the rearward portion thereof by means of set screws 116 passing through slots 117 in the rearward portion. By loosening the set screws 116 and rotating the forward portion 115 of the sleeve relatively to the rearward portion, the cam seats 114 may be brought into position to force the threading dies 105 inwardly to the exact extent desired.

It should be noted that the length to which the bolt is screw threaded may be regulated by adjusting the position of cone 70 on its supporting rod 69. This adjustment also requires an additional adjustment of arm 108 carrying knock off lug 107, in order that the moment of release of the cutting dies may be made to correspond with the hastened or retarded retraction of the spindle and of tripping disk 95 to properly time the movement of turret 14. A similar adjustment of the cones 70 of the spindles 51 and 53 which carry the pointing and nut attaching heads 19 and 21 must also be made so that all the spindles will be advanced and retracted simultaneously.

The means for supplying nuts to the nut attaching head 21 is illustrated in detail in Figures 13 and 14 of the drawings. Such mechanism comprises a nut hopper 118 on a suitable support 119, and a nut delivering rocker arm 120 rigidly secured to a shaft 121 passing through the hopper. On shaft 121 is a lever arm 122 against which a helical spring 123 normally bears to maintain the rocker arm 120 in its raised position. Surrounding an eccentric 124 on shaft 9, is a sleeve member 125 having thereon a push rod 125ª extending through an aperture in the lever arm 122 and bearing against spring 123. Rotation of the eccentric 124 thus serves to actuate the rocker arm 120. The rocker arm 120 serves to deliver nuts, as is fully described in my prior Patent No. 1,149,553, dated August 10, 1915, into a suitable nut receiving chute. The nut chute 126, here shown, receives nuts from the hopper 118, and delivers them to the nut attaching head 21.

The nut attaching head 21 is illustrated in detail in Figures 10, 11, and 12 of the drawings. This head comprises a stationary guard member 127, rigidly secured to or integral with a supporting standard 128; and a chuck portion 129, arranged to be frictionally engaged for its rotation with the head operating spindle 53. Secured to the forward extremity of chuck 129 is a plate 130 having therein a nut receiving slot 131, arranged to receive nuts from the nut chute 126. Bolted to the chuck 129 are springs 132 arranged to press friction blocks 133 against the spindle 53.

To the rear of the friction blocks 133 is a collar 134, having thereon a hub 135. Loosely mounted on hub 135 and between collar 134 and a second collar 136, is a support 137 free to move longitudinally with spindle 52 without rotating therewith. To the support 137 is rigidly secured a pin 138, slidably mounted in an upright member 139 on standard 50. Upon the forward movement of the head 21 and spindle 53, the pin 138 enters the bore of the last nut within the chute 126, leaving three nuts within the slot 131 in the plate 130 of the nutting head and so supporting the remaining nuts in chute 126 that they are prevented from entering such slot during the time when the nutting head lies in its forward and operative position.

With a bolt in position before the nutting head 21 and during advancement of the head and spindle 53, the head is caused to rotate with the spindle by means of the pressure of springs 132 upon friction blocks 133. The rotation of the head causes the nut 140 to be screwed onto the end of the bolt which is presented to the head. During this rotation, the remaining nuts in slot 131 are held in the slot by means of the stationary guard member 127, which prevents such rotation from flinging them outwardly. Until screwed onto the bolt and removed thereby, the nut 140 is held in the slot by springs 142 which yield to allow it to be withdrawn when attached. In order that the bolt to be provided with a nut may be brought into position and may be removed after the nut has been attached, a pair of entrance and exit gates 142ª and 143 are provided. These gates are pivotally secured to the guard member and are normally held in closed position to form part thereof by means of a pair of springs 144.

Special means are provided to prevent jamming of the operating parts in the event that a defective nut or a defective bolt should be presented for the nutting operation. Such means comprise a headed plunger 145, lying to the rear of the nut 140 and against which bears a coiled spring 146 lying within a recess 147 in the chuck. If, therefore, the bolt has not been properly screw threaded or the nut is defective, the spring 146 will yield as the nut 140 is brought to bear against the end of the bolt. It is necessary however, that the spring should not be compressed to an extent equal to the width of the nut as in such case one of the other nuts in the slot 131 would slip into position in front of the nut 140 thus causing a jam in the machine. For this purpose, the tension of spring 146 is so adjusted that the spring will yield for a distance less than the width of a nut. Any further yielding action which may be necessary, is provided by relatively stiff spring 148 in the bolt holding chuck 18, which is compressed only after the spring 146 has been compressed to its limit.

In order that nuts from the chute 126 may enter the slot 131, it is necessary that the nutting head should be held against rotation with the slot 131 aligned with chute 126, in retracted position of the operating spindle 53. This inoperative, or charging, position is the one illustrated in Figure 10 of the drawings. In order to effect this purpose, a locking plate 149 is secured to standard 50. This plate 149 has a curved locking slot 150 into which a pin 151 projects in retracted position of spindle 53 and head 21. Upon such retraction, the pin 151 enters the locking recess 150, and the head continues to rotate until pin 151 has reached the extremity of the slot. As the head 21 is normally held to rotate with spindle 53 only by the pressure of springs 132 upon the friction blocks 133, the locking action of pin 151 in slot 150 suffices to hold the head 21 against rotation so that the spindle 53 rotates idly therein. The degree of pressure locking the friction blocks 133 to the spindle 53 may be regulated by means of set screws 152 which regulate the tension of springs 132.

To summarize the operation of the machine: Power is imparted to the machine by means of pulley 2 on the shaft 3, and a blank bolt is placed in one of the bolt holding chucks in position to have its forward portion supported by the carrying wheel 48. During the period of retraction of spindles 51, 52, and 53, this bolt is brought into position before the pointing head. It should be understood that the carrying wheel 48 is not relied upon to center the bolts before the heads, as it supports their forward portion a little below the exact center of the heads. If then the head of the bolt be held in proper position in the bolt holding chuck 18, the operating means of the operating heads themselves serve to center the bolts.

After locking of the latch mechanism of the spindles by the cams 73, 74 and 75, the heads are advanced and the pointing head 19 performs its function upon the blank bolt presented to it. As no bolts are yet held in operative position before screw threading head 20 and nutting head 21, these heads rotate idly at this stage.

Upon unlocking of the latch mechanism of the spindles by cone 70, the spindles and heads are all carried rearwardly, and the latch mechanism of the spindles is again locked. During the interval comprising the rearward and forward movement of the spindles, the tripping mechanism which comprises the key 85 and latch hook 88 functions to operatively connect shaft 9 for imparting to it a single complete revolution. In the period during which the operating heads are in their forward position, a second bolt has been placed by the operator in the next succeeding bolt holder; so that the second step through which the turret is rotated places a blank bolt in position before the pointing head and a pointed bolt in position before the screw threading device.

It will be understood that after the third step through which turret 14 is rotated, if blank bolts are continued to be fed to the turret, a bolt will lie before each of the pointing, screw threading, and nutting heads in position to be operated upon thereby. At this, and each succeeding cycle of the machine, the three operations will be performed simultaneously upon three bolts until the feeding of bolts to the machine is discontinued. At each backward movement of the spindle carrying the nutting head, a single nut is fed to it to replace the one attached to the bolt last operated upon.

It is to be understood that in one sense the machine above described comprises three separate machines, each embodying invention in its construction. Thus the identical mechanism described in connection with each of the pointing, screw threading, and nutting heads, together with the operating and bolt carrying means therefor, may be utilized as a separate machine. These separate constructions, and the operating means therefor, are designed with particular reference to their cooperation in a single unitary machine.

As the mechanism above described is susceptible of a number of modifications without departing from the spirit of the invention, no limitations, other than those contained in the appended claims, are to be imposed upon the scope of the invention.

What I claim is:

1. In a bolt finishing machine the combination of a plurality of operating heads arranged to perform different finishing operations upon a bolt, bolt carrying means arranged for step by step rotation, actuating spindles for said operating heads, and means controlled by said actuating spindles for imparting the step by step rotation to said bolt carrying means.

2. In a bolt finishing machine the combination of a plurality of operating heads to perform different finishing operations upon a bolt, a bolt carrying turret rotatably mounted before said heads, means for imparting to said turret step by step rotation and for locking it in position before said operating heads, actuating spindles for said operating heads, and tripping means operated by one of said spindles for causing actuation of the rotating and locking means of the turret.

3. In a bolt finishing machine the combination of operating heads, a turret mounted on a revoluble shaft in operative position before said heads, an actuating shaft, a peripherally serrated wheel on the turret shaft, a dog arranged to enter such peripheral serrations, an actuating shaft, and an eccentric operatively disconnecting said dog from said operating shaft, and means for causing a single timed revolution of said shaft.

4. In a bolt finishing machine the combination of an operating head, a bolt holder therefor, an operating spindle for said head, latch mechanism comprising a nut arranged to engage a screw threaded portion of said spindle for causing forward movement thereof, resilient means arranged to be compressed by forward movement of the spindle, means carried by the spindle for opening said latch mechanism to release said spindle, and mechanically operated means independent of the operating spindle for automatically closing said latch mechanism.

5. In a bolt finishing machine the combination of an operating head, a bolt holder therefor, an operating spindle for said head, latch mechanism arranged to engage said spindle for causing forward movement thereof, resilient means arranged to be compressed by forward movement of the spindle, means carried by the spindle for opening said latch mechanism to release said spindle, and a cam carried by a mechanically rotated shaft and arranged to close said latch mechanism at a timed interval after the opening thereof.

6. In a bolt finishing machine the combination of an operating head, an operating spindle for said head, latch mechanism comprising a nut arranged to engage a screw-threaded portion of said spindle for causing forward movement thereof, means carried by the spindle for operating said latch mechanism to release the spindle, means for retracting the spindle upon opening of the latch mechanism, mechanically operated means independent of said latch mechanism for automatically closing said latch mechanism, a rotatable bolt holder for presenting bolts to said operating head, and means governed by movement of the operating spindle for rotating said bolt carrying means with a timed step by step movement.

7. In a bolt finishing machine the combination of an operating head, an operating spindle for said head, latch mechanism arranged to engage said spindle for causing forward movement thereof, means carried by the spindle for operating said latch mechanism to release the spindle, means for retracting the spindle upon opening of the latch mechanism, a cam carried by a mechanically rotated shaft and arranged to close said latch mechanism at a timed interval after the opening thereof, a rotatable bolt holder for presenting bolts to said operating head, and means governed by movement of the operating spindle for rotating said bolt carrying means with a timed step by step movement.

8. In a bolt finishing machine having an operating head, a head operating spindle, and means for automatically advancing and retracting said spindle: a rotatable bolt holder, a shaft operatively connected therewith, a tripping lever, means arranged to connect said shaft for timed rotation upon tripping of said lever, and tripping means carried by said spindle and arranged to cooperate with said tripping lever.

9. In a bolt finishing machine having an operating head, and an operating spindle therefor, a rotatable bolt holder, a shaft operatively connected therewith, and tripping means arranged to be actuated by said spindle and to cause timed rotation of said shaft.

10. In a bolt finishing machine having an operating head, and an operating spindle therefor: a rotatable bolt holder, a shaft operatively connected therewith, a tripping lever, means arranged to connect said shaft for timed rotation upon tripping of said lever, and tripping means carried by said spindle and arranged to cooperate with said tripping lever.

11. In a bolt finishing machine having an operating head, and an operating spindle therefor: a rotatable bolt holder, a shaft operatively connected therewith, a driving member normally free on said shaft, means for locking said driving member to said shaft, and means for imparting a timed actuation to said locking means.

12. In a bolt finishing machine having an operating head, and an operating spindle therefor: a rotatable bolt holder, a shaft operatively connected therewith, a driving member normally free on said shaft, a collar secured to said shaft, a key arranged to connect said collar with said driving member, and means for bringing said key into and out of position to connect said collar and said driving member.

13. In a bolt finishing machine having an operating head, and an operating spindle therefor: a rotatable bolt holder, a shaft operatively connected therewith, a driving member normally free on said shaft, a collar secured to said shaft, a key in said collar, resilient means arranged to exert a force for causing said key to mutually engage said collar and said driving means, latch mechanism for withholding said key from such engagement, and means for actuating said latch mechanism.

14. In a bolt finishing machine an operating spindle, a rotatable bolt holder, a shaft operatively connected therewith, a driving member free on said shaft, a collar secured to said shaft, a key arranged to connect said collar with said driving member, latch mechanism for withholding said key from such engagement, a tripping lever operatively connected with said latch mechanism, and a member on said operating spindle arranged to contact said tripping lever for releasing said latch mechanism and imparting a timed actuation to said shaft.

15. In a bolt finishing machine an operating spindle, means for advancing and retracting said spindle, a bolt pointing head on said spindle, and adjustable means in said pointing head for regulating the depth of cut made thereby.

16. In a bolt finishing machine an operating spindle, means for advancing and retracting said spindle, a bolt pointing head on said spindle, and a stop rod adjustable longitudinally in said pointing head for regulating the depth of cut made thereby.

17. In a bolt finishing machine an operating spindle, means for automatically advancing and retracting said spindle; a rotatable bolt holder, a shaft operatively connected therewith, tripping means arranged to cause timed rotation of said shaft, a bolt pointing head on said spindle, and adjustable means in said pointing head for regulating the depth of cut made thereby.

18. In a bolt finishing machine an operating spindle, means for automatically advancing and retracting said spindle; a rotatable bolt holder, a shaft operatively connected therewith, tripping means arranged to cause timed rotation of said shaft, a bolt pointing head on said spindle, and a stop rod adjustable longitudinally in said pointing head for regulating the depth of cut made thereby.

19. In a bolt finishing machine an operating spindle, means for automatically advancing and retracting said spindle; a rotatable bolt holder, a shaft operatively connected therewith, a tripping lever, means arranged to connect said shaft for timed rotation upon tripping of said lever, tripping means carried by said spindle and arranged to cooperate with said tripping lever, a bolt pointing head on said spindle, and adjustable means in said pointing head for regulating the depth of cut made thereby.

20. In a bolt finishing machine an operating spindle, means for automatically advancing and retracting said spindle; a rotatable bolt holder, a shaft operatively connected therewith, a tripping lever, means arranged to connect said shaft for timed rotation upon tripping of said lever, tripping means carried by said spindle and arranged to cooperate with said tripping lever, a bolt pointing head on said spindle, and a stop rod adjustable longitudinally in said pointing head for regulating the depth of cut made thereby.

21. In a bolt finishing machine an operating spindle, a rotatable bolt holder, a shaft operatively connected therewith, tripping means arranged to be actuated by said spindle and to cause timed rotation of said shaft, a bolt pointing head on said spindle, and adjustable means in said pointing head for regulating the depth of cut made thereby.

22. In a bolt finishing machine an operating spindle, a rotatable bolt holder, a shaft operatively connected therewith, tripping means arranged to be actuated by said spindle and to cause timed rotation of said shaft, a bolt pointing head on said spindle, and a stop rod adjustable longitudinally in said pointing head for regulating the depth of cut made thereby.

23. In a bolt finishing machine an operating spindle, a rotatable bolt holder, a shaft operatively connected therewith, a driving member normally free on said shaft, means for locking said driving member to said shaft, means for imparting a timed actuation to said locking means, a bolt pointing head on said spindle, and adjustable means in said pointing head for regulating the depth of cut made thereby.

24. In a bolt finishing machine an operating spindle, a rotatable bolt holder, a shaft operatively connected therewith, a driving member normally free on said shaft, means for locking said driving member to said shaft, means for imparting a timed actuation to said locking means, a bolt pointing head on said spindle, and a stop rod adjustable longitudinally in said pointing head for regulating the depth of cut made thereby.

25. In a bolt finishing machine an operating spindle, a rotatable bolt holder, a shaft operatively connected therewith, a driving member normally free on said shaft, a collar secured to said shaft, a key arranged to connect said collar with said driving member, means for bringing said key into and out of position to connect said collar and driving member, a bolt pointing head on said spindle, and adjustable means in said pointing head for regulating the depth of cut made thereby.

26. In a bolt finishing machine an operating spindle, a rotatable bolt holder, a shaft operatively connected therewith, a driving member normally free on said shaft, a collar secured to said shaft, a key arranged to connect said collar with said driving member, means for bringing said key into and out of position to connect said collar and said driving member, a bolt pointing head on said spindle, and a stop rod adjustable longitudinally in said pointing head for regulating the depth of cut made thereby.

27. In a bolt finishing machine an operating spindle, a rotatable bolt holder, a shaft operatively connected therewith, a driving member normally free on said shaft, a collar secured to said shaft, a key in said collar, resilient means arranged to exert a force for causing said key to mutually engage said collar and said driving means, latch mechanism for withholding said key from such engagement, means for actuating said latch mechanism, a bolt pointing head on said spindle, and adjustable means in said pointing head for regulating the depth of cut made thereby.

28. In a bolt finishing machine an operating spindle, a rotatable bolt holder, a shaft operatively connected therewith, a driving member normally free on said shaft, a collar secured to said shaft, a key in said collar, resilient means arranged to exert a force for causing said key to mutually engage said collar and said driving means, latch mechanism for withholding said key from such engagement, means for actuating said latch mechanism, a bolt pointing head on said spindle, and a stop rod adjustable longitudinally in said pointing head for regulating the depth of cut made thereby.

29. In a bolt finishing machine an operating spindle, a rotatable bolt holder, a shaft operatively connected therewith, a driving member normally free on said shaft, means for locking said driving member to said shaft, a collar secured to said shaft, a key arranged to connect said collar with said driving member, means operated by said head operating spindle for imparting a timed actuation to said locking means, a bolt pointing head on said spindle, and adjustable means in said pointing head for regulating the depth of cut made thereby.

30. In a bolt finishing machine an operating spindle, a rotatable bolt holder, a shaft operatively connected therewith, a driving member normally free on said shaft, means for locking said driving member to said shaft, a collar secured to said shaft, a key arranged to connect said collar with said driving member, means operated by said head operating spindle for imparting a timed actuation to said locking means, a bolt pointing head on said spindle, and a stop rod adjustable longitudinally in said pointing head for regulating the depth of cut made thereby.

31. In a bolt finishing machine, an operating spindle, and a nutting head on said spindle; said nutting head comprising a chuck or nut holding member, and a guard member surrounding the forward portion of said chuck and provided with spring held gates for permitting the passage of a bolt into position before said chuck.

32. In a bolt finishing machine an operating spindle, and a nutting head on said spindle; said nutting head comprising a chuck or nut holding member, and yielding means in said chuck against which the nut to be applied to a bolt lies arranged to permit free rearward movement of the nut during its attachment to a bolt.

33. In a bolt finishing machine an operating spindle, and a nutting head on said spindle; said nutting head comprising a chuck or nut holding member, yielding means in said chuck against which the nut to be applied to a bolt lies arranged to permit free rearward movement of the nut during its attachment to a bolt, and a guard member provided with spring held gates for permitting the passage of a bolt into position before said chuck.

34. In a bolt finishing machine an operating spindle, and a nutting head comprising a nut holding chuck free on said spindle, and resilient means for holding said chuck on said spindle to rotate therewith.

35. In a bolt finishing machine an operating spindle, and a nutting head comprising a nut holding chuck frictionally engaged on said spindle, yielding means in said chuck against which the nut to be applied to a bolt bears, and a guard member provided with spring held gates.

36. In a bolt finishing machine an operating spindle, a nut feeding chute, a nut holding chuck free on said spindle, resilient means for engaging said chuck on said spindle to rotate therewith, and yielding means in said chuck arranged to offer relatively slight resistance to rearward movement of a nut during the operation of screwing a nut on a bolt.

37. In a bolt finishing machine an operating spindle, means for rotating and for advancing and retracting said spindle, a nut feeding chute, a nut holding chuck on said spindle, and means for withholding nuts in said chute in advanced position of the spindle.

38. In a bolt finishing machine an operating spindle, a nut feeding chute, a nut holding chuck free on said spindle, resilient means for engaging said chuck on said spindle to rotate therewith, yielding means in said chuck arranged to offer relatively slight resistance to rearward movement of a nut during the operation of screwing a nut on a bolt, and a guard member provided with spring held gates for permitting the passage of a bolt into position before said chuck.

39. In a bolt finishing machine an operating spindle, means for rotating and for advancing and retracting said spindle, a nut feeding chute, a nut holding chuck frictionally engaged on said spindle, and means for holding said chuck against rotation and in position to receive nuts from said chute during retracted position of said spindle.

40. In a bolt finishing machine an operating spindle, means for rotating and for advancing and retracting said spindle, a nut feeding chute, a nut holding chuck frictionally engaged on said spindle, means for withholding nuts in said chute in advanced position of the spindle, and means for holding said chuck against rotation and in position to receive nuts from said chute during retracted position of said spindle.

41. In a bolt finishing machine an operating spindle, means for rotating and for advancing and retracting said spindle, a nut feeding chute, a nut holding chuck frictionally engaged on said spindle, a stop carried by said chuck, and a member having therein a curved slot arranged to cooperate with said stop to hold said chuck against rotation and in position to receive nuts from said chute in retracted position of the spindle.

42. In a bolt finishing machine an operating spindle, means for rotating and for advancing and retracting said spindle, a nut feeding chute, a nut holding chuck on said spindle, and a pin arranged to be carried forward by said spindle and to enter said nut feeding chute in advanced position of the spindle for withholding the nuts therein.

43. In a bolt finishing machine an operating spindle, means for rotating and for advancing and retracting said spindle, a nut feeding chute, a nut holding chuck frictionally engaged on said spindle, means for holding said chuck against rotation and in position to receive nuts from said chute during retracted position of said spindle, and yielding means in said chuck against which the nut to be applied to a bolt lies.

44. In a bolt finishing machine an operating spindle, means for rotating and for advancing and retracting said spindle, a nut feeding chute, a nut holding chuck frictionally engaged on said spindle, means for withholding nuts in said chute in advanced position of the spindle, means for holding said chuck against rotation and in position to receive nuts from said chute during retracted position of said spindle, and yielding means in said chuck against which the nut to be applied to a bolt lies.

45. In a bolt finishing machine an operating spindle, a bolt holder, a nut holding chuck on said spindle, a guard member arranged to cooperate with said chuck and provided with spring held gates for permitting the passage of a bolt into position before said chuck, a bolt holder, yielding means in said chuck arranged to offer relatively slight resistance to rearward movement of a nut during the operation of screwing a nut on a bolt, and yielding means in said bolt holder against which the head of a bolt lies arranged to offer relatively greater resistance to longitudinal movement of a bolt in the holder.

46. In a bolt finishing machine an operating spindle, a bolt holder, a nut holding chuck on said spindle, yielding means in said chuck arranged to offer relatively slight resistance to rearward movement of a nut during the operation of screwing a nut on a bolt, and yielding means in said bolt holder against which the head of a bolt lies arranged to offer relatively greater resistance to longitudinal movement of a bolt in the holder.

47. In a bolt finishing machine an operating spindle, means for rotating and for advancing and retracting said spindle, a nut feeding chute, a nut holding chuck frictionally engaged on said spindle, means for holding said chuck against rotation and in position to receive nuts from said chute during retracted position of said spindle, yielding means in said chuck against which the nut to be applied to a bolt lies, a bolt holder, and yielding means in said bolt holder against which the head of a bolt lies.

48. In a bolt finishing machine an operating spindle, means for rotating and for advancing and retracting said spindle, a nut feeding chute, a nut holding chuck frictionally engaged on said spindle, means for withholding nuts in said chute in advanced position of the spindle, means for holding said chuck against rotation and in position to receive nuts from said chute during retracted position of said spindle, yielding means in said chuck against which the nut to be applied to a bolt lies, a bolt holder, and yielding means in said bolt holder against which the head of a bolt lies.

49. In a bolt finishing machine an operating spindle, means for rotating and for advancing and retracting said spindle, a nut feeding chute, a nut holding chuck frictionally engaged on said spindle, a stop carried by said chuck, a member having therein a curved slot arranged to cooperate with said stop to hold said chuck against rotation and in position to receive nuts from said chute in retracted position of the spindle, yielding means in said chuck arranged to offer relatively slight resistance to rearward movement of a nut during the operation of screwing a nut on a bolt, a bolt holder, and yielding means in said bolt holder against which the head of a bolt lies arranged to offer relatively greater resistance to longitudinal movement of a bolt in the holder.

50. In a bolt finishing machine an operating spindle, means for rotating and for advancing and retracting said spindle, a nut feeding chute, a nut holding chuck on said spindle, a pin arranged to be carried forward by said spindle and to enter said nut feeding chute in advanced position of the spindle for withholding the nuts therein, yielding means in said chuck arranged to offer relatively slight resistance to rearward movement of a nut during the operation of screwing a nut on a bolt, a bolt holder, and yielding means in said bolt holder against which the head of a bolt lies arranged to offer relatively greater resistance to longitudinal movement of a bolt in the holder.

51. In a bolt finishing machine an operating spindle, means for rotating and for advancing and retracting said spindle, a stop carried by said chuck, a member having therein a curved slot arranged to cooperate with said stop to hold said chuck against rotation and in position to receive nuts from said chute in retracted position of the spindle, a pin arranged to be carried forward by said spindle and to enter said nut feeding chute in advanced position of the spindle for withholding the nuts therein, yielding means in said chuck against which the nut to be applied to a bolt lies, a bolt holder, and yielding means in said bolt holder against which the head of a bolt lies.

52. In a bolt finishing machine the combination of a bolt holder, an operating spindle, latch mechanism arranged to engage said spindle for causing forward movement thereof, resilient means arranged to be compressed by forward movement of the spindle, means carried by the spindle for opening said latch mechanism to release said spindle, mechanically operated means for automatically closing said latch mechanism, a nut feeding chute, a nut holding chuck frictionally engaged on said spindle, and yielding means in said chuck against which the nut to be applied to a bolt lies.

53. In a bolt finishing machine the combination of a bolt holder, an operating spindle, latch mechanism arranged to engage said spindle for causing forward movement thereof, resilient means arranged to be compressed by forward movement of the spindle, means carried by the spindle for opening said latch mechanism to release said spindle, mechanically operated means independent of said spindle for automatically closing said latch mechanism, a nut feeding chute, a nut holding chuck on said spindle, and means for withholding nuts in said chute in advanced position of the spindle.

54. In a bolt finishing machine the combination of a bolt holder, an operating spindle, latch mechanism arranged to engage said spindle for causing forward movement thereof, resilient means arranged to be compressed by forward movement of the spindle, means carried by the spindle for opening said latch mechanism to release said spindle, mechanically operated means for automatically closing said latch mechanism, a nut feeding chute, a nut holding chuck frictionally engaged on said spindle, yielding means in said chuck against which the nut to be applied to a bolt lies, and a guard member provided with spring held gates.

55. In a bolt finishing machine the combination of an operating spindle, latch mechanism arranged to engage said spindle for causing forward movement thereof, means carried by the spindle for operating said latch mechanism to release the spindle, means for retracting the spindle upon opening of the latch mechanism, mechanically operated means for automatically closing said latch mechanism, a rotatable bolt holder for presenting bolts to said operating head, means governed by movement of the operating spindle for rotating said bolt carrying means with a timed step by step movement, a nut feeding chute, a nut holding chuck frictionally engaged on said spindle, and yielding means in said chuck against which the nut to be applied to a bolt lies.

56. In a bolt finishing machine the combination of an operating spindle, latch mechanism arranged to engage said spindle for causing forward movement thereof, means carried by the spindle for operating said latch mechanism to release the spindle, means for retracting the spindle upon opening of the latch mechanism, mechanically operated means for automatically closing said latch mechanism, a rotatable bolt holder for presenting bolts to said operating head, means governed by movement of the operating spindle for rotating said bolt carrying means with a timed step by step movement, a nut feeding chute, a nut holding chuck on said spindle, and means for withholding nuts in said chute in advanced position of the spindle.

57. In a bolt finishing machine an operating spindle, means for automatically advancing and retracting said spindle; a rotatable bolt holder, a shaft operatively connected therewith, tripping means arranged to cause timed rotation of said shaft, a nut feeding chute, a nut holding chuck frictionally engaged on said spindle, and yielding means in said chuck against which the nut to be applied to a bolt lies.

58. In a bolt finishing machine an operating spindle, means for automatically advancing and retracting said spindle; a rotatable bolt holder, a shaft operatively connected therewith, tripping means arranged to cause timed rotation of said shaft, a nut feeding chute, a nut holding chuck on said spindle, and means for withholding nuts in said chute in advanced position of the spindle.

59. In a bolt finishing machine an operating spindle, means for automatically advancing and retracting said spindle; a rotatable bolt holder, a shaft operatively connected therewith, tripping means arranged to cause timed rotation of said shaft, a nut feeding chute, a nut holding chuck frictionally engaged on said spindle, yielding means in said chuck against which the nut to be applied to a bolt lies, and a guard member provided with spring held gates.

60. In a bolt finishing machine an operating spindle, means for automatically advancing and retracting said spindle; a rotatable bolt holder, a shaft operatively connected therewith, tripping means arranged to cause timed rotation of said shaft, a nut feeding chute, a nut holding chuck frictionally engaged on said spindle, and means for holding said chuck against rotation and in position to receive nuts from said chute during retracted position of said spindle.

61. In a bolt finishing machine an operating spindle, means for automatically advancing and retracting said spindle; a rotatable bolt holder, a shaft operatively connected therewith, tripping means arranged to cause timed rotation of said shaft, a nut feeding chute, a nut holding chuck frictionally engaged on said spindle, means for withholding nuts in said chute in advanced position of the spindle, and means for holding said chuck against rotation and in position to receive nuts from said chute during retracted position of said spindle.

62. In a bolt finishing machine an operating spindle, means for automatically advancing and retracting said spindle; a rotatable bolt holder, a shaft operatively connected therewith, tripping means arranged to cause timed rotation of said shaft, a nut feeding chute, a nut holding chuck on said spindle, a pin arranged to be carried forward by said spindle and to enter said nut feeding chute in advanced position of the spindle for withholding the nuts therein.

63. In a bolt finishing machine an operating spindle, means for automatically advancing and retracting said spindle; a rotatable bolt holder, a shaft operatively connected therewith, a tripping lever, means arranged to connect said shaft for timed rotation upon tripping of said lever, tripping means carried by said spindle and arranged to cooperate with said tripping lever, a nut feeding chute, a nut holding chuck frictionally engaged on said spindle, and yielding means in said chuck against which the nut to be applied to a bolt lies.

64. In a bolt finishing machine an operating spindle, means for automatically advancing and retracting said spindle; a rotatable bolt holder, a shaft operatively connected therewith, a tripping lever, means arranged to connect said shaft for timed rotation upon tripping of said lever, tripping means carried by said spindle and arranged to cooperate with said tripping lever, a nut feeding chute, a nut holding chuck on said spindle, and means for withholding nuts in said chuck in advanced position of the spindle.

65. In a bolt finishing machine an operating spindle, means for automatically advancing and retracting said spindle; a rotatable bolt holder, a shaft operatively connected therewith, a tripping lever, means arranged to connect said shaft for timed rotation upon tripping of said lever, tripping means carried by said spindle and arranged to cooperate with said tripping lever, a nut feeding chute, a nut holding chuck frictionally engaged on said spindle, yielding means in said chuck against which the nut to be applied to a bolt lies, and a guard member provided with spring held gates.

66. In a bolt finishing machine an operating spindle, means for automatically advancing and retracting said spindle; a rotatable bolt holder, a shaft operatively connected therewith, a tripping lever, means arranged to connect said shaft for timed rotation upon tripping of said lever, tripping means carried by said spindle and arranged to cooperate with said tripping lever, a nut feeding chute, a nut holding chuck frictionally engaged on said spindle, and means for holding said chuck against rotation and in position to receive nuts from said chute during retracted position of said spindle.

67. In a bolt finishing machine an operating spindle, means for automatically advancing and retracting said spindle; a rotatable bolt holder, a shaft operatively connected therewith, a tripping lever, means arranged to connect said shaft for timed rotation upon tripping of said lever, tripping means carried by said spindle and arranged to cooperate with said tripping lever, a nut feeding chute, a nut holding chuck frictionally engaged on said spindle, means for withholding nuts in said chute in advanced position of the spindle, and means for holding said chuck against rotation and in position to receive nuts from said chute during retracted position of said spindle.

68. In a bolt finishing machine an operating spindle, means for automatically advancing and retracting said spindle; a rotatable bolt holder, a shaft operatively connected therewith, a tripping lever, means arranged to connect said shaft for timed rotation upon tripping of said lever, tripping means carried by said spindle and arranged to cooperate with said tripping lever, a nut feeding chute, a nut holding chuck on said spindle, and a pin arranged to be carried forward by said spindle and to enter said nut feeding chute in advanced position of the spindle for withholding the nuts therein.

69. In a bolt finishing machine an operating spindle, a rotatable bolt holder, a shaft operatively connected therewith, a tripping lever, means arranged to connect said shaft for timed rotation upon tripping of said lever, tripping means carried by said spindle and arranged to cooperate with said tripping lever, a nut feeding chute, a nut holding chuck frictionally engaged on said spindle, and yielding means in said chuck against which the nut to be applied to a bolt lies.

70. In a bolt finishing machine an operating spindle, a rotatable bolt holder, a shaft operatively connected therewith, a tripping lever, means arranged to connect said shaft for timed rotation upon tripping of said lever, tripping means carried by said spindle and arranged to cooperate with said tripping lever, means for rotating and for advancing and retracting said spindle, a nut feeding chute, a nut holding chuck on said spindle, and means for withholding nuts in said chuck in advanced position of the spindle.

71. In a bolt finishing machine an operating spindle, a rotatable bolt holder, a shaft operatively connected therewith, a tripping lever, means arranged to connect said shaft for timed rotation upon tripping of said lever, tripping means carried by said spindle and arranged to cooperate with said tripping lever, a nut feeding chute, a nut holding chuck frictionally engaged on said spindle, yielding means in said chuck against which the nut to be applied to a bolt lies, and a guard member provided with spring held gates.

72. In a bolt finishing machine an operating spindle, a rotatable bolt holder, a shaft operatively connected therewith, a tripping lever, means arranged to connect said shaft for timed rotation upon tripping of said lever, tripping means carried by said spindle and arranged to cooperate with said tripping lever, means for rotating and for advancing and retracting said spindle, a nut feeding chute, a nut holding chuck frictionally engaged on said spindle, and means for holding said chuck against rotation and in position to receive nuts from said chute during retracted position of said spindle.

73. In a bolt finishing machine an operating spindle, a rotatable bolt holder, a shaft operatively connected therewith, a tripping lever, means arranged to connect said shaft for timed rotation upon tripping of said lever, tripping means carried by said spindle and arranged to cooperate with said tripping lever, means for rotating and for advancing and retracting said spindle, a nut feeding chute, a nut holding chuck frictionally engaged on said spindle, means for withholding nuts in said chuck in advanced position of the spindle, and means for holding said chuck against rotation and in position to receive nuts from said chute during retracted position of said spindle.

74. In a bolt finishing machine an operating spindle, a rotatable bolt holder, a shaft operatively connected therewith, a tripping lever, means arranged to connect said shaft for timed rotation upon tripping of said lever, tripping means carried by said spindle and arranged to cooperate with said tripping lever, means for rotating and for advancing and retracting said spindle, a nut feeding chute, a nut holding chuck on said spindle, and a pin arranged to be carried forward by said spindle and to enter said nut feeding chute in advanced position of the spindle for withholding the nuts therein.

75. In a bolt finishing machine an operating spindle, a rotatable bolt holder, a shaft operatively connected therewith, a driving member normally free on said shaft, means for locking said driving member to said shaft, means for imparting a timed actuation to said locking means, a nut feeding chute, a nut holding chuck frictionally engaged on said spindle, and yielding means in said chuck against which the nut to be applied to a bolt lies.

76. In a bolt finishing machine an operating spindle, a rotatable bolt holder, a shaft operatively connected therewith, a driving member normally free on said shaft, means for locking said driving member to said shaft, means for imparting a timed actuation to said locking means, means for rotating and for advancing and retracting said spindle, a nut feeding chute, a nut holding chuck on said spindle, and means for withholding nuts in said chute in advanced position of the spindle.

77. In a bolt finishing machine an operating spindle, a rotatable bolt holder, a shaft operatively connected therewith, a driving member normally free on said shaft, means for locking said driving member to said shaft, means for imparting a timed actuation to said locking means, a nut feeding chute, a nut holding chuck frictionally engaged on said spindle, yielding means in said chuck against which the nut to be applied to a bolt lies, and a guard member provided with spring held gates.

78. In a bolt finishing machine an operating spindle, a rotatable bolt holder, a shaft operatively connected therewith, a driving member normally free on said shaft, means for locking said driving member to said shaft, means for imparting a timed actuation to said locking means, means for rotating and for advancing and retracting said spindle, a nut feeding chute, a nut holding chuck frictionally engaged on said spindle, and means for holding said chuck against rotation and in position to receive nuts from said chute during retracted position of said spindle.

79. In a bolt finishing machine an operating spindle, a rotatable bolt holder, a shaft operatively connected therewith, a driving member normally free on said shaft, means for locking said driving member to said shaft, means for imparting a timed actuation to said locking means, means for rotating and for advancing and retracting said spindle, a nut feeding chute, a nut holding chuck frictionally engaged on said spindle, means for withholding nuts in said chute in advanced position of the spindle and means for holding said chuck against rotation and in position to receive nuts from said chute during retracted position of said spindle.

80. In a bolt finishing machine an operating spindle, a rotatable bolt holder, a shaft operatively connected therewith, a driving member normally free on said shaft, means for locking said driving member to said shaft, means for imparting a timed actuation to said locking means, means for rotating and advancing and retracting said spindle, a nut feeding chute, a nut holding chuck on said spindle, and a pin arranged to be carried forward by said spindle and to enter said nut feeding chute in advanced position of the spindle for withholding the nuts therein.

81. In a bolt finishing machine an operating spindle, a rotatable bolt holder, a shaft operatively connected therewith, a driving member normally free on said shaft, a collar secured to said shaft, a key arranged to connect said collar with said driving member, means for bringing said key into and out of position to connect said collar and said driving member, a nut feeding chute, a nut holding chuck frictionally engaged on said spindle, and yielding means in said chuck against which the nut to be applied to a bolt lies.

82. In a bolt finishing machine an operating spindle, a rotatable bolt holder, a shaft operatively connected therewith, a driving member normally free on said shaft, a collar secured to said shaft, a key arranged to connect said collar with said driving member, means for bringing said key into and out of position to connect said collar and said driving member, means for rotating and for advancing and retracting said spindle, a nut feeding chute, a nut holding chuck on said spindle, and means for withholding nuts in said chute in advanced position of the spindle.

83. In a bolt finishing machine an operating spindle, a rotatable bolt holder, a shaft operatively connected therewith, a driving member normally free on said shaft, a collar secured to said shaft, a key arranged to connect said collar with said driving member, means for bringing said key into and out of position to connect said collar and said driving member, a nut feeding chute, a nut holding chuck frictionally engaged on said spindle, yielding means in said chuck against which the nut to be applied to a bolt lies, and a guard member provided with spring held gates.

84. In a bolt finishing machine an operating spindle, a rotatable bolt holder, a shaft operatively connected therewith, a driving member normally free on said shaft, a collar secured to said shaft, a key arranged to connect said collar with said driving member, means for bringing said key into and out of position to connect said collar and said driving member, means for rotating and for advancing and retracting said spindle, a nut feeding chute, a nut holding chuck frictionally engaged on said spindle, and means for holding said chuck against rotation and in position to receive nuts from said chute during retracted position of said spindle.

85. In a bolt finishing machine an operating spindle, a rotatable bolt holder, a shaft operatively connected therewith, a driving member normally free on said shaft, a collar secured to said shaft, a key arranged to connect said collar with said driving member, means for bringing said key into and out of position to connect said collar and said driving member, means for rotating and for advancing and retracting said spindle, a nut feeding chute, a nut holding chuck frictionally engaged on said spindle, means for withholding nuts in said chute in advanced position of the spindle, and means for holding said chuck against rotation and in position to receive nuts from said chute during retracted position of said spindle.

86. In a bolt finishing machine an operating spindle, a rotatable bolt holder, a shaft operatively connected therewith, a driving member normally free on said shaft, means for locking said driving member to said shaft, means for imparting a timed actuation to said locking means, means for rotating and for advancing and retracting said spindle, a nut feeding chute, a nut holding chuck on said spindle, and a pin arranged to be carried forward by said spindle and to enter said nut feeding chute in advanced position of the spindle for withholding the nuts therein.

In testimony whereof I hereunto set my hand.

HUBERT CREHAN.

Witnesses:
FLORENCE F. SCHWARTZ,
GRETTA W. ALSTON.